US 6,750,788 B2
(12) United States Patent
Block

(10) Patent No.: US 6,750,788 B2
(45) Date of Patent: *Jun. 15, 2004

(54) DISPLAY SYSTEM FOR AIRPLANE COCKPIT OR OTHER VEHICLE

(75) Inventor: Gerald J. Block, Rancho Santa Fe, CA (US)

(73) Assignee: Sandel Avionics, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/863,140

(22) Filed: May 22, 2001

(65) Prior Publication Data

US 2001/0035831 A1 Nov. 1, 2001

Related U.S. Application Data

(62) Division of application No. 08/934,825, filed on Sep. 22, 1997, now Pat. No. 6,259,378.

(51) Int. Cl.⁷ .............................................. G08B 23/00
(52) U.S. Cl. ..................... 340/963; 340/945; 340/971
(58) Field of Search ................... 340/963, 945, 340/971, 973, 980; 353/74; 348/445

(56) References Cited

U.S. PATENT DOCUMENTS

| 3,925,750 A | 12/1975 | Gilbert et al. |
| 3,945,720 A | 3/1976 | Ellis |
| 4,170,400 A | 10/1979 | Bach et al. |
| 4,195,915 A | 4/1980 | Lichty et al. |
| 4,397,555 A | 8/1983 | Malcolm et al. |
| 4,463,355 A | 7/1984 | Schultz et al. |
| 4,616,226 A | 10/1986 | Morley |
| 4,835,537 A | 5/1989 | Manion |
| 4,855,891 A | 8/1989 | Paul |
| 4,896,154 A | 1/1990 | Factor et al. |
| 4,912,477 A | 3/1990 | Lory et al. |
| 4,914,733 A | 4/1990 | Gralnick |
| 5,057,835 A | 10/1991 | Factor et al. |
| 5,071,209 A | 12/1991 | Chang et al. |
| 5,134,394 A | 7/1992 | Beadle |
| 5,140,532 A | 8/1992 | Beckwith, Jr. et al. |
| 5,152,012 A | 9/1992 | Schwob |
| 5,218,355 A | 6/1993 | Burkhardt |
| 5,374,932 A | 12/1994 | Wyschogrod et al. |
| 5,398,045 A | 3/1995 | Sach et al. |
| 5,467,085 A | * 11/1995 | Dunn .......................... 340/971 |
| 5,475,594 A | * 12/1995 | Oder et al. .................... 701/14 |
| 5,519,618 A | 5/1996 | Kastner et al. |
| 5,521,658 A | * 5/1996 | Donohoe ...................... 353/98 |
| 5,543,870 A | * 8/1996 | Blanchard .................... 353/74 |

(List continued on next page.)

FOREIGN PATENT DOCUMENTS

EP     0117281 A2     9/1984

OTHER PUBLICATIONS

*Plane & Pilot*, "Sandel Avionics Improves the View", p. 22, Jun. 1998.
"Introducing the new COLOR Argus 5000CE and 7000CE."
"EFS 40/50 Bendix/King Electronic Flight Instrument Systems."
"RDS 82/82VP Digital 4–Color Weather Radar and Vertical Profile™ Weather Radar by Bendix/King."
"Bendix/King TCAS CAS 81/CAS 67A/CAS66A," Allied Signal Aerospace General Aviation Avionics.

(List continued on next page.)

*Primary Examiner*—John Tweel
(74) *Attorney, Agent, or Firm*—Mark D. Wieczorek

(57) ABSTRACT

A display system for an airplane or other vehicle is disclosed. A rear projection LCD is used to allow for a maximum amount of screen area to be used in displaying operator pertinent data.

14 Claims, 9 Drawing Sheets

U.S. PATENT DOCUMENTS

| | | | |
|---|---|---|---|
| 5,561,854 A | | 10/1996 | Antic et al. |
| 5,594,561 A | | 1/1997 | Blanchard |
| 5,594,942 A | | 1/1997 | Antic et al. |
| 5,604,849 A | | 2/1997 | Artwick et al. |
| 5,651,676 A | | 7/1997 | Artwick |
| 5,657,009 A | | 8/1997 | Gordon |
| 5,668,542 A | * | 9/1997 | Wright ........................ 340/971 |
| 5,673,086 A | | 9/1997 | Fukuoka et al. |
| 5,677,842 A | | 10/1997 | Denoize et al. |
| 5,726,719 A | * | 3/1998 | Tanaka et al. .................. 349/8 |
| 5,736,922 A | | 4/1998 | Goode, III et al. |
| 5,838,262 A | | 11/1998 | Kershner et al. |
| 5,839,080 A | * | 11/1998 | Muller et al. ................... 701/9 |
| 5,860,721 A | | 1/1999 | Bowron et al. |
| 5,940,013 A | | 8/1999 | Vladimir et al. |
| 5,999,924 A | | 12/1999 | Bair et al. |
| 6,003,024 A | | 12/1999 | Bair et al. |
| 6,088,634 A | * | 7/2000 | Muller et al. ................... 701/9 |
| 6,092,009 A | | 7/2000 | Glover |
| 6,122,570 A | | 9/2000 | Muller et al. |
| 6,138,060 A | | 10/2000 | Conner et al. |
| 6,148,308 A | | 11/2000 | Neubauer et al. |
| 6,219,592 B1 | | 4/2001 | Muller et al. |
| 6,222,912 B1 | | 4/2001 | Breuer |
| 6,233,573 B1 | | 5/2001 | Bair et al. |
| 6,259,378 B1 | * | 7/2001 | Block ......................... 340/963 |

OTHER PUBLICATIONS

"MK VII Ground Proximity Warning System," Allied Signal Aerospace Commercial Avionics Systems.
"Terrain Awareness and Display System, Enhanced Ground Proximity Warning System," Allied Signal Aerospace.
"GNS–XL Global Wulfsberg Flight Management System," Allied Signal Aerospace General Aviation Avionics.
"FPD 500 Allied Signal Flat Panel Display System."
"GH–3000 ESIS Electronic Standby Instrument System," BF Goodrich Aerospace.
"Stormscope® WX–950 Weather Mapping System," BF Goodrich Avionics System.
"Sandel LCD HSI" *Flying Magazine* P. 62 (Aug. 1998).
Aopa Pilot "Sandel SN 3308 HIS" Feb. 1999, p. 142–144.
Sony "LCX019AMA: 3.4 cm (1.32–inch) LCD Panel (with microlens)", p. 1–22.
*Avweb NeWsWire* p. 4 (Oct. 27, 1997).
"New Products: A first in map displays," *Plane & Pilot* p. 78 (Jan. 1998).
"Cheap Glass: Sandel's breakthrough LCD technology yields affordable multi–function EFIS for the Cessna and Piper set," *The Aviation Consumer* pp. 4–8 (Sep. 1998).
IBM Corporation, "Check Point Copy for a Two Stage Store", IBM Technical Disclosure Bulletin, vol. 20, Issue 5, pp. 1955–1958 (Oct., 1977).

* cited by examiner

DISPLAY SYSTEM FOR AIRPLANE COCKPIT OR OTHER VEHICLE

CROSS-REFERENCE TO RELATED APPLICATIONS

This is a divisional of U.S. patent application Ser. No. 08/934,825 (now U.S. Pat. No. 6,259,378) filed Sep. 22, 1997, entitled "Display System for Airplane Cockpit or other Vehicle" by Gerald Block, the entire disclosure of which is hereby expressly incorporated by reference.

BACKGROUND OF THE INVENTION

1. Field of the Invention

The present invention relates generally to display systems for airplane cockpits or other vehicles, and more particularly, to a rear projection digital display system which allows a high level of information to be selectively displayed regarding such data as travel path, travel conditions, vehicle condition, geographical conditions, and hazard or obstruction warnings.

2. Description of the Related Art

The layouts of cockpits for airplanes are regulated by the FAA in the United States. The SAE (Society of Automotive Engineers), which acts as a standards writing/recommending body to the FAA, has issued standards for aircraft instruments which are adhered to in aircraft construction. For example, the 3ATI slot standard, which is an ARINC (Aeronautical Radio, Inc.) standard, has been complied with in the vast majority of all aircraft in use today. This standard was developed when electromechanical display devices, such as HSI (Horizontal Situation Indicator), were the norm, and only allows a panel area of 3"×3" in dimension.

With the advance of digital technology, there has been a need in the industry to replace these displays with digital versions, to provide increased reliability, accuracy and more functionality. However, the planes cannot be easily retrofitted with digital equipment that require a bigger screen, and the required 3×3 panel has conventionally proven to be too small for digital displays. The 3"×3" display has been a major impediment to the development of such a digital display.

First, standard direct view LCDs are not mass produced in this size, and therefore a specially made LCD for 3"×3" can cost as much as $10,000 each to produce. Furthermore, due to the construction of the direct view LCD, the outer perimeter of the device cannot be used to display information, as it is used by the drive electronics. As a result, the 3"×3" LCD typically produces a display area of only 2.3"×2.3". This reduced display area impedes the ability to put enough information on the display for it to be useable for many functions.

A second problem addressed by the invention is the growing demand in the avionics industry for more sophisticated "situational awareness for safety" (SAS) technology. This refers to technology which provides the pilot with more easily understandable and more comprehensive information about the immediate surroundings, and any hazards which may be present.

For example, in 1996, there were 246 general aviation airplane crashes in the United States. Of these crashes, 42 were controlled flight into terrain (CFIT). That is, situations in which the airplane was flown into an obstruction such as a mountain, an antenna or the ground under control of the pilot. Typically these instances occur when visibility is very low and the pilot is off course. As a result, the pilot is unaware of the natural obstructions in the flight path because the display devices only provide information on the desired flight course.

It is believed that if the present invention had been available for these planes, a large number of these accidents would have been prevented, and hundreds of lives saved. Thus, there is a need in the industry for (1) technology to effectively collect data on surrounding structures even when the pilot is off path, and (2) hardware to display this information in a simple and direct manner to the pilot, preferably using digital instruments.

SUMMARY OF THE INVENTION

Accordingly, it is an object of the present invention to overcome the above-noted deficiencies in the prior art.

In particular, in certain aspects of the invention, an avionics display device may include a rear projection LCD system which obtains maximum display area in a 3ATI display slot.

In addition, in the present invention the microprocessor may receive G.P.S. ("Global Positioning System") data as an input, and may also have a memory which stores topographical map data (e.g., Defense Mapping Agency topographical information of North America or other geographical area) in database form. The device correlates the G.P.S. and topographical data to determine the location of the aircraft, and any obstacles in the flight path or surrounding area. Other navigational devices (e.g. VOR) may also be used to determine position. In addition, data from the flux gate and gyro may be used to aid in determining the flight path of the aircraft. From this information, upcoming obstacles are determined from the DOD topographical data and are displayed to the pilot.

In certain embodiments of the invention, different types of information are selectively displayable on the system. To avoid clutter and ease of understanding, user inputs are provided to allow the pilot to selectively turn on or off the display of certain information. For example, as the pilot is approaching the runway for a landing, and is within visible range of the runway, the pilot may turn off the rearward view or navigational aids not associated with the approach to the runway.

In addition, it should be noted that while the present invention is a well-suited for use in the avionics cockpit display, it is equally applicable to other vehicles.

DETAILED DESCRIPTION

General Description

Figure 1:
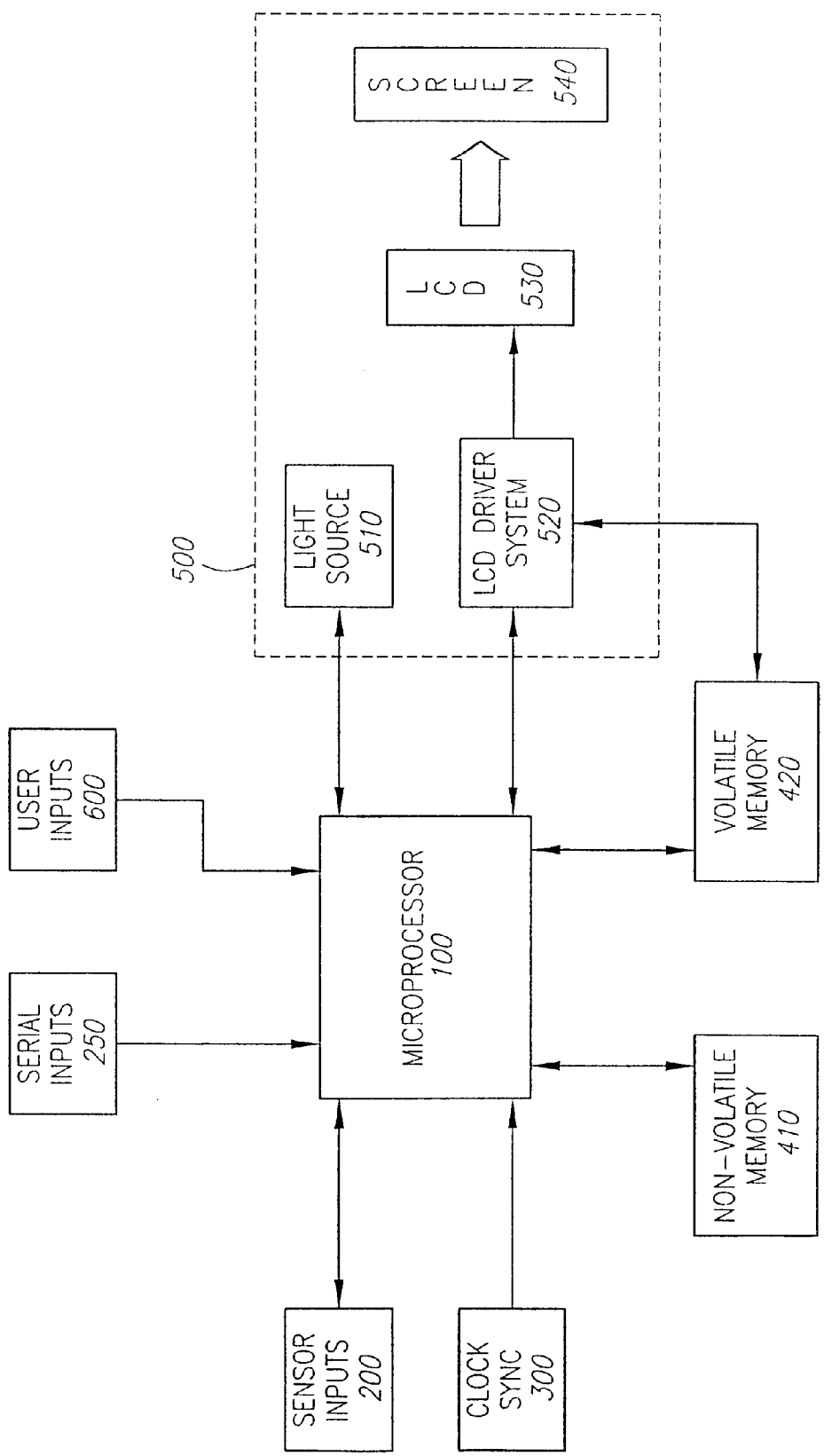
FIG. 1 is block diagram of the components of one embodiment of the present invention.

FIG. 1 is a block diagram of the overall system. The entire system is run by a microprocessor 100 which may be the MPC 821 manufactured by Motorola. As will be explained more fully below, microprocessor 100 receives a plurality of the sensor inputs 200 which may include, for example, G.P.S. information, flux gate data, gyro data, etc. The sensor inputs 200 are sampled and input to processor 100 in sync with clock sync signal 300. The microprocessor 100 receives clock sync signal 300 and regenerates and supplies it to the attached devices. Microprocessor 100 is also associated with a non-volatile memory 410, which may be a flash memory such as model 208F800 manufactured by Intel. This memory is used to store operational software, database information, and repetitive screen data as explained more fully below. Microprocessor 100 is also associated with volatile memory 420, such as DRAM, for storing information used during operation, and graphical information for driving the display system. Typically, memories 410 and 420 each will have at least 4M bytes of storage space.

Microprocessor 100 also controls rear projection system 500, which includes a light source 510, LCD driver system 520, and a rear projection LCD 530, which displays data on screen 540. The LCD driver system 520 receives the graphical information from memory 420, which is programmed by the microprocessor 100. Microprocessor 100 programs the graphical data into memory 420 based on the data received from sensor inputs 200, and the user input conditions received from a user input device 600.

Figure 2:
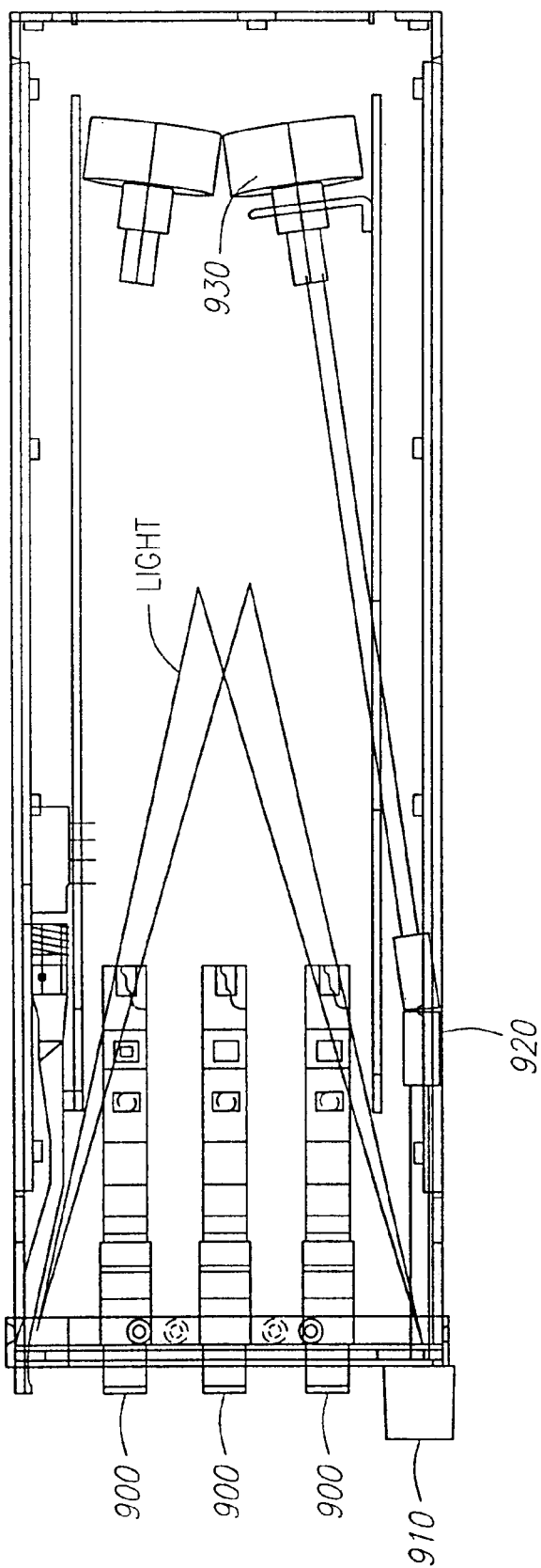
FIG. 2 is a cross section of one embodiment of the invention.

As is shown in FIG. 2, the entire device may be fitted into a 3ATI box. As shown, user input device 600 (FIG. 1) includes a plurality of buttons 900 and at least one knob 910 which are selectively positioned so as not to obstruct screen 540 (not shown). Referring to FIGS. 1 and 2, these devices are positioned within the instrument so as to avoid crossing the light path between light source 510, LCD 530 and the image path between the LCD 530 and screen 540. The mechanical aspects of the present invention to achieve such a compact and unobstructed design will be explained more fully hereinafter.

Rear Projection LCD Display System

Figure 3A:
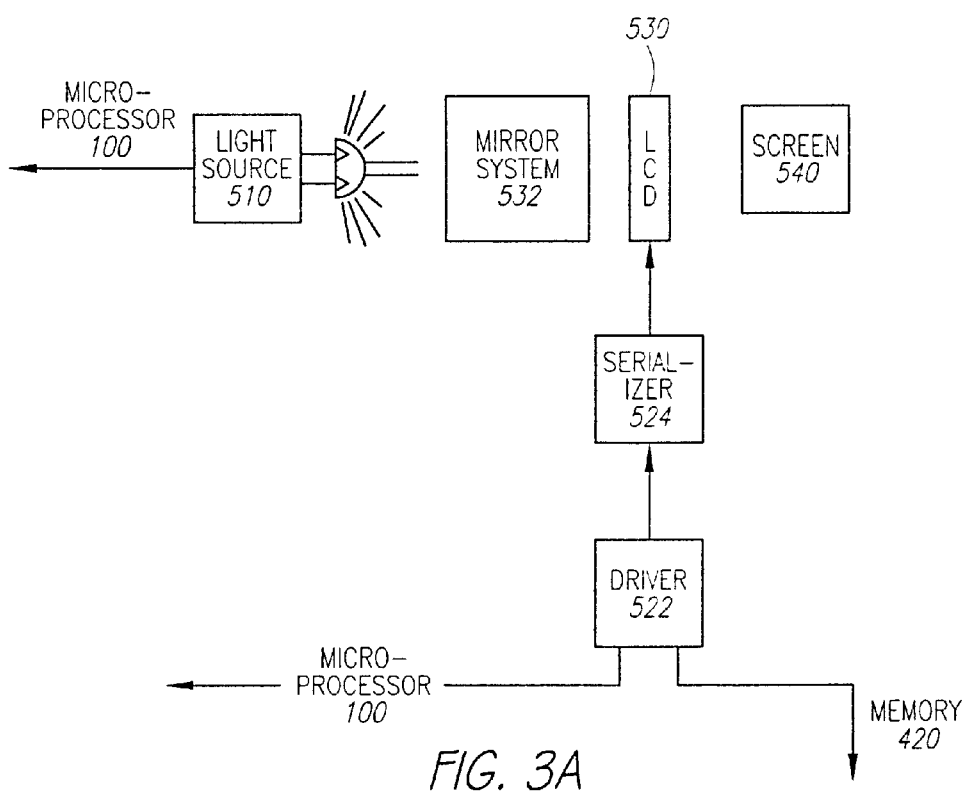
FIG. 3A is a block diagram of one embodiment of the video display system of the invention.

FIG. 3A is a more detailed block diagram of rear projection system 500 which includes light source 510, mirror system 532, LCD 530, LCD driver 522, serializer 524 and screen 540. A commercially available TFT (Thin Film Transistor) type LCD may be used for the image projection, although any suitable projection LCD system may be used. LCD 530 and mirror system 532 make up a filterless microlens type rear projection LCD. An example of such device is the Sony model no. LCX019. The LCX019 has a substantially rectangular image generation area (active area) of 26.9 mm×20.1 mm, which provides an approximately 4:3 aspect ratio. The device may operate as follows: Light source 510 emanates white light, and mirror system 532 breaks up the light into three components, R, G, B, respectively along a first axis R, a second axis G, and a third axis B, all three of which are at an angle to one another. The light rays R, G, B impinge upon individual pixels of LCD 530 at discreet angles. In accordance with electrical signals received from LCD driver 522 and serializer 524, which are formulated in response to data from microprocessor 100 and the graphical data from memory 420, the individual pixels of LCD 530 are adjusted so as to collectively form a color image which is projected along optical axis X and on to screen 540. The LCD 530 may be updated at any desired rate via driver 520, but preferably is updated at 30 frames per second. The operation of the LCD driver is described below.

Figure 3B:
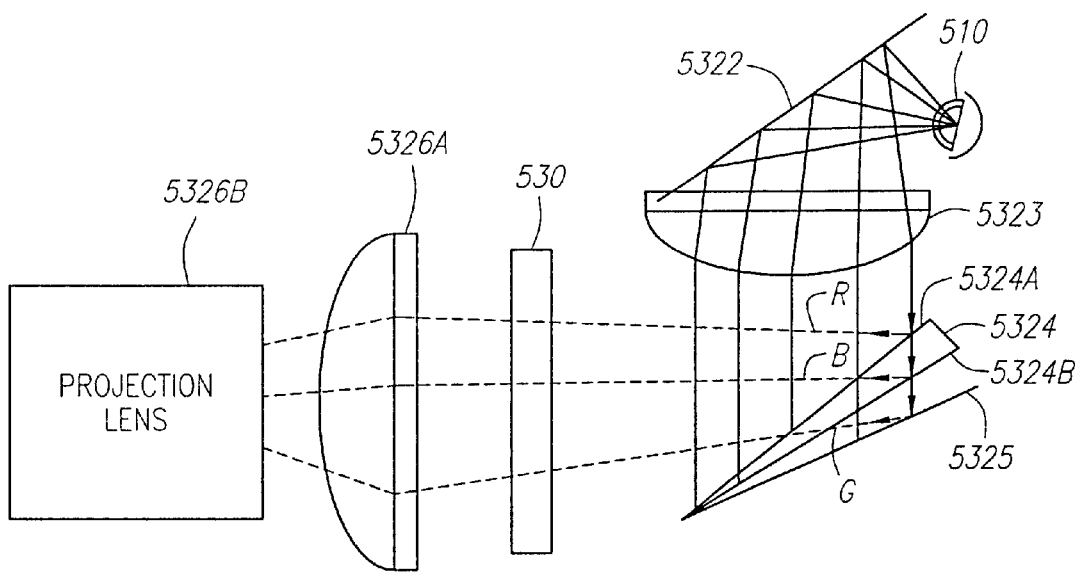
FIG. 3B is a more detailed block diagram of the mirror and LCD system of an embodiment of the invention.

A more detailed description of the light system of one embodiment of the invention is provided with reference to FIG. 3B. Lamp or other light source 510 generates white light which is reflected off a first mirror 5322 and passed through a condenser lens 5323 so as to form a collimated light beam which is then presented to a dichroic lens system 5324. The system includes a wedge 5324 which has a top surface 5324A coated with a dichroic material which reflects red light and passes all other colors. The reflected red is direct to the LCD at 7 degrees above the line normal to the LCD. The second surface 5324B of the wedge 5324 reflects blue at 0 degrees to the normal and passes all other colors. Beneath the wedge 5324 is a mirror 5325, which reflects the remaining green light −7 degrees with respect to the normal. For sake of simplicity, this is illustrated in FIG. 3B with respect to only one ray of light. Of course, in operation all light presented to the wedge 5324 and mirror 5325 will undergo similar separation. R, G and B light beams are then impinged upon LCD 530. Following the LCD 530, the formed image is passed through a projection lens system, including lenses 5326A and 5326B and projected on the screen.

It should be noted that instead of a wedge 5324, two separate mirror plates could be used. However, the wedge arrangement achieves the same results as a mirror system, while avoiding the necessity of light passing through up to four additional surfaces (e.g., the green light would have to go through two extra surfaces on the way down and two extra surfaces on the way up). This allows for greater display intensity.

The LCD driver system 520 includes a digital to analog converter. The analog data is then input to the serializer 524, which is then input to LCD 530. The LCD driver 522 is refreshed from a graphics buffer which is in memory 420. This is done in hardware. If processor 100 stops updating the screen memory, the LCD driver 522 will still continue to pull the screen data in bursts from the graphics buffer in memory 420, and keep the LCD image updated. This means that processor 100 does not have to update the screen graphics data at a constant speed in order to eliminate flicker.

The screen data is updated in "push-pull" graphics buffers. This means that while a first buffer is used for LCD refresh, the processor software updates a second buffer. When the processor is done with the new update, it sets a "ready" flag and changes the start address for the LCD driver 522. This is called a "handoff" of the new buffer. When the LCD driver 522 is at the end of the current screen refresh period, it will automatically use the new buffer address, placing the newly updated graphics data on the screen. The LCD driver 522 also generates an interrupt in processor 100 which indicates "handoff complete" by resetting the "ready" flag and setting the address of the next update buffer. This flag/address indicates the free buffer and will be used by the main program loop for the next update.

A three buffer system may be used to accomplish this result.
 1. Buffer currently displayed (read-only until hand-off to next buffer).
 2. Buffer being painted (will become next displayed).
 3. Buffer being cleared (will become next painted).

The use of a three buffer scheme allows the buffer clear operation to be done by direct memory access (DMA) which improves processor efficiency by allowing processor software execution to occur simultaneously with screen buffer clearing.

In order to increase system speed, repetitively displayed graphics, e.g. background graphics such as a compass pattern, are written only once and stored as background scenes. Thus, instead of the buffer being cleared to black, the appropriate repetitive scene is copied via DMA into the buffer. This allows the paint procedures to add only the appropriate graphics on top of the repetitive scene.

Thus, the process of reading and writing three buffers, (buffer 0, buffer 1, and buffer 2) is as follows:

1. Refresh the LCD screen with data from buffer 0.
2. Processor 100 and memory 420 cooperate to store a new graphic into buffer 1.
3. Processor 100 and memory 420 cooperate to store repetitive scene data in buffer 2.
4. Refresh the LCD screen with data from buffer 1.
5. Write new scene data into buffer 2 to overlay repetitive scene data already in buffer 2.
6. Store repetitive scene data in buffer 0.
7. Refresh the LCD screen with data in buffer 2.

It will be recognized that the above description is merely one example of how the LCD reading and writing and driving functions may be performed. It will be clear to those of ordinary skill in the art that many other types of memory and program architecture are possible to achieve similar results.

Sensor Inputs

Figure 4:
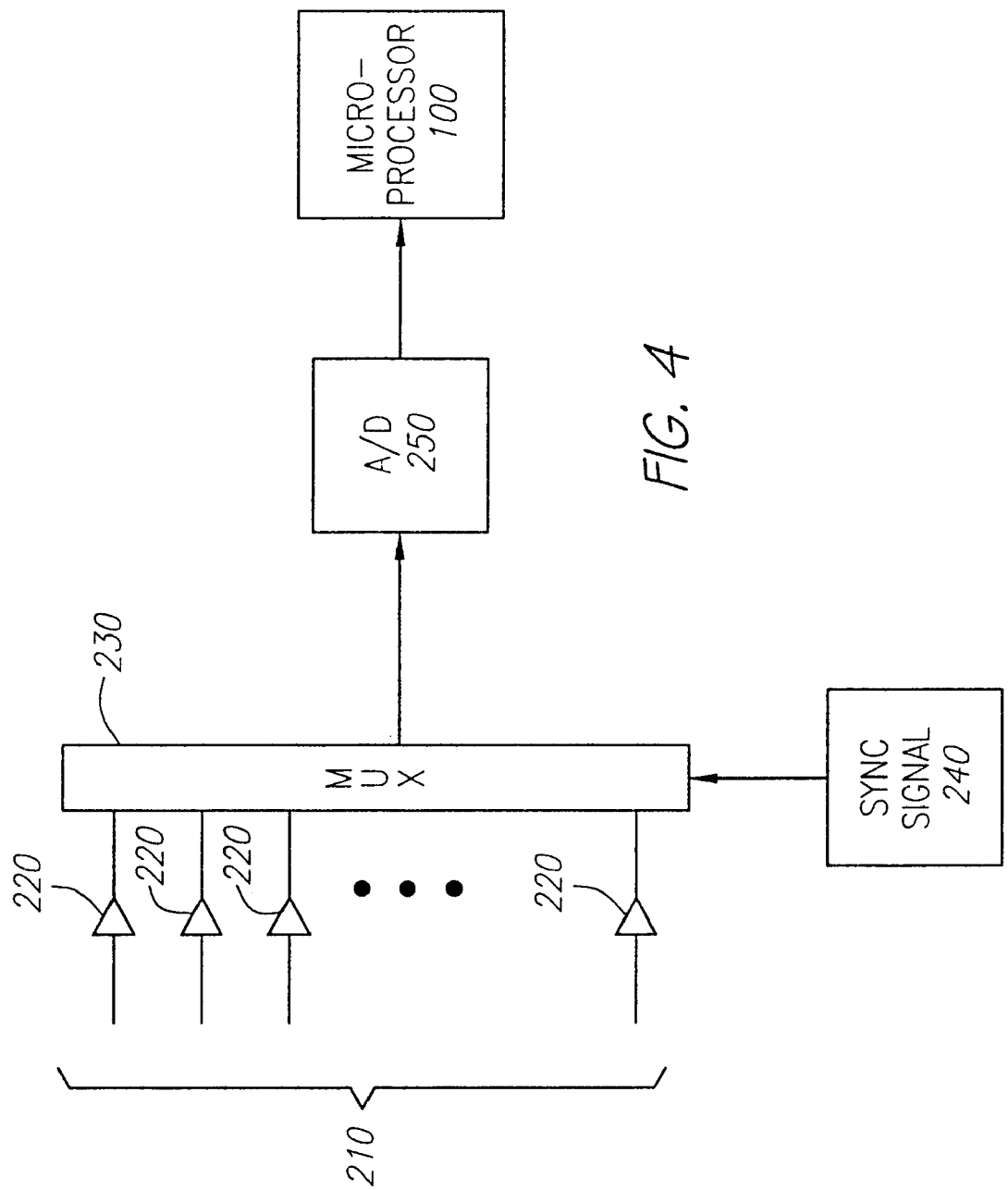
FIG. 4 is a block diagram of one embodiment of the sensor input system of the invention.

The present invention receives a plurality of sense signals, which are used by processor 100 to calculate various parameters such as current heading, height off ground, longitude and latitude positions, attitude of the aircraft, etc. As shown in FIG. 4, a plurality of signals 210 may be received from various sensors in the aircraft. The signals 210 may be fed into signal conditioning circuits 220 which in turn are fed into a 48 channel multiplexor 230. The multiplexor 230 also receives a clock control signal 240. In one embodiment, the clock control sync signal 240 is the A/C power supply of the aircraft which is 400 Hz. Use of the aircraft power supply of the clock signal is advantageous to sync multiplexor sampling to the A/C sensors, as sensors throughout the aircraft may be synched with processor 100 and the multiplexor 230 without the need for a separate clock signal to be run throughout the aircraft. The use of a single multiplexor 230 also allows use of a single A/D converter 250 which inputs to microprocessor 100. Signal inputs 210 include signals from the flux gate, the directional gyro, the G.P.S. receiver, the ILS receiver (instructional landing system) which provides for precision approach guidance and landing. As shown in FIG. 1, some inputs may be directly coupled to the microprocessor 100 by serial input 250. For example, GPS data may be serial input from a GPS receiver. Or, data from the radar altimeter, which indicates the height of aircraft above the ground may be input by serial input. Depending on the priority level of the data, some of the inputs may be sampled once per cycle while others may be sampled multiple times per cycle through the multiplexor 230.

In some embodiments a 1600 Hz sync signal is generated by "synching" off the peak voltages and zero crossings of the 400 Hz power supply signal. This allows faster sampling.

In addition to the above-described sensors, additional sensors such as a lightening sensor may be used. Indeed any navigational or other flight data sensor may be used.

In certain embodiments of the invention, nonvolatile memory 410 will store a database corresponding to a topographical map illustrating different obstacles throughout a given sector of the world based on longitudinal and latitudinal locations. The sensor data which provides the plane's location such as a G.P.S. receiver, or a similar type system will be reviewed by the microprocessor 100 and correlated via a look-up table with the topographical data. As a result, microprocessor 100 will be able to determine if any obstacles are within the flight path of the aircraft or within the vicinity of the aircraft. This data, as explained below, can then be displayed to the pilot in a succinct manner so as to alert him of the possibility of hitting the obstacle.

Memory 410 also stores other database information, such as airport location, runway data, magnetic north data, etc.

The present invention also provides a unique method of updating the database information stored in memory 410.

As is well known in the art, database information such as airport location, magnetic data, etc., is updated on a regular basis. However, when these databases are updated, they have an effective date in which they will become applicable.

Databases are updated by a regular maintenance procedure on the airplane. In particular, a maintenance computer is attached to the onboard microprocessor by, for example, a serial port. The maintenance computer updates the database to include the effective data. However, the problem is where the maintenance on the airplane is performed prior to the effective date of the new data. In such situations, the airplane has conventionally been forced to store both the "old" database information as well as the soon to be effective database information, thereby doubling the amount of memory required. However, according to the present invention, the database is updated such that only the changed information of database is written into the memory. These changed information points are written into a portion of the memory referred to as continuation data. Using the database, microprocessor 100 will first read the anticipated data from the regular portion of the database, and then it will check the conditional memory section to see if any changes have been made in data currently being polled. If a change has been made, microprocessor 100 determines whether the new effective date has taken place, and if it has, it uses the new data in the conditional memory; otherwise, it uses the old data. That is, the maintenance computer determines the contents of the database of the onboard computer and determines what data has changed. It only uploads the changed data. For example, in one embodiment the onboard memory contains data indicating the date of the last update. The maintenance computer checks this date and from this can determine what data to add. It should be noted that multiple changes may be made to a particular data point, with each change stored in the continuation memory. Of course, if desired the extra main memory may be re-updated and the continuation memory cleared.

This system has two main benefits. First, it reduces the amount of onboard memory that is required, thereby reducing the cost of the device, and second, it speeds up the maintenance process of uploading the new data to the airplane as it is only necessary to upload the changed data.

Mechanical Improvements

As explained above, one of the aspects of the invention concerns maximizing the displayable area of the LCD screen. In one embodiment of the invention directed to a 3ATI avionics slot, any blockage of the 3"×3" screen can result in a useable display area which is too small for practical purposes. Accordingly, one aspect of the invention is directed to the optimization of the placement of the user input devices, i.e., the user buttons and knobs which allow the pilot to control the symbolage displayed on the device. According to FIG. 2, a plurality of push buttons 900 are arranged along the outer perimeter of the display device. In addition, at least one turn knob 910 is set in the bottom corner of the display device, to avoid conflict with the viewing area. Knob 910 is then connected via a universal joint 920 to a rotary encoder 930. Alternatively, a flexible shaft could be used instead of a joint arrangement. The use of the universal joints solves two problems. First, it allows the placement of the knobs to be substantially parallel and proximate to the outer casing of the device. Second, it allows the shafts of the knobs to be placed out of the optical path of the LCD.

The system of the present invention allows 8.4 square inches of a 3ATI panel, which has 9.56 square inches of possible space, to be used for video display. Thus, about 88% of the screen is utilized. According to the invention, preferably at least 70% (e.g., for a 3ATI panel slot about 6.7 square inches) of the screen is used. More preferably, 75–88% (e.g., for a 3ATI panel slot about 7.2 to 8.4 square inches) is used, or at least 75% (e.g., for a 3ATI panel slot about 7.2 square inches). Even greater advantages are achieved by using at least 80% (e.g., for a 3ATI panel slot about 7.6 square inches) of the screen, or at least 85% (e.g., for a 3ATI panel slot about 8.5 square inches). Accordingly, one embodiment utilizes in the range of about 80% of the screen.

Operation

Figure 5:
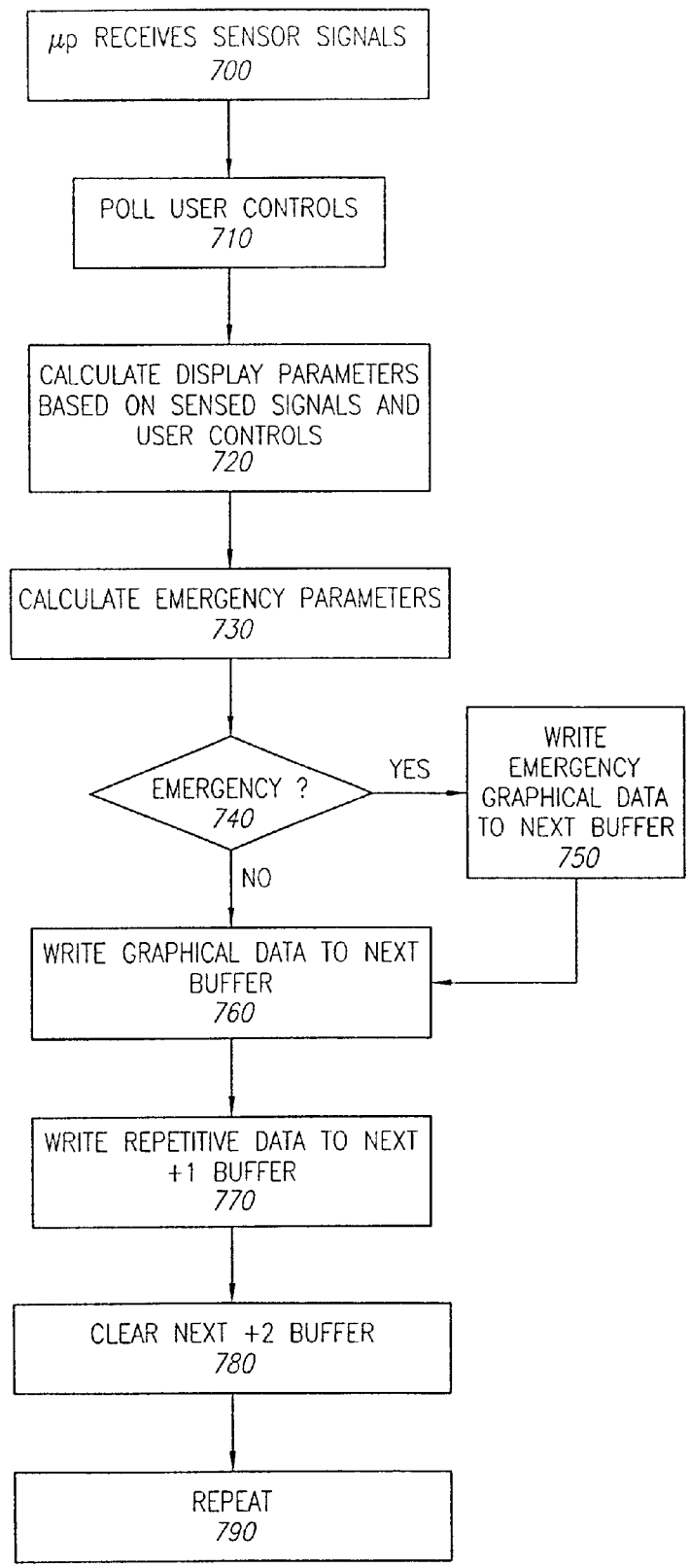
FIG. 5 is a program flow chart of the operation of one embodiment of the invention.

Referring to FIG. 5, the program flow of the present invention will be described. In step 700, the processor 100 receives the sensor signals from sensor inputs 210. This is done as the multiplexor steps through each of the inputs. In step 710, the microprocessor 100 polls the user input buttons, to determine the symbolage and various data to be displayed on the screen. In step 720, processor 100 calculates the required display parameters, e.g., attitude of the plane, compass direction, and other such data based upon the sensed signals and the particular graphical modes selected by the user controls. In steps 730 to 750, processor 100 calculates any "emergency" parameters, even if they were not selected by the user in step 720.

Figure 6:
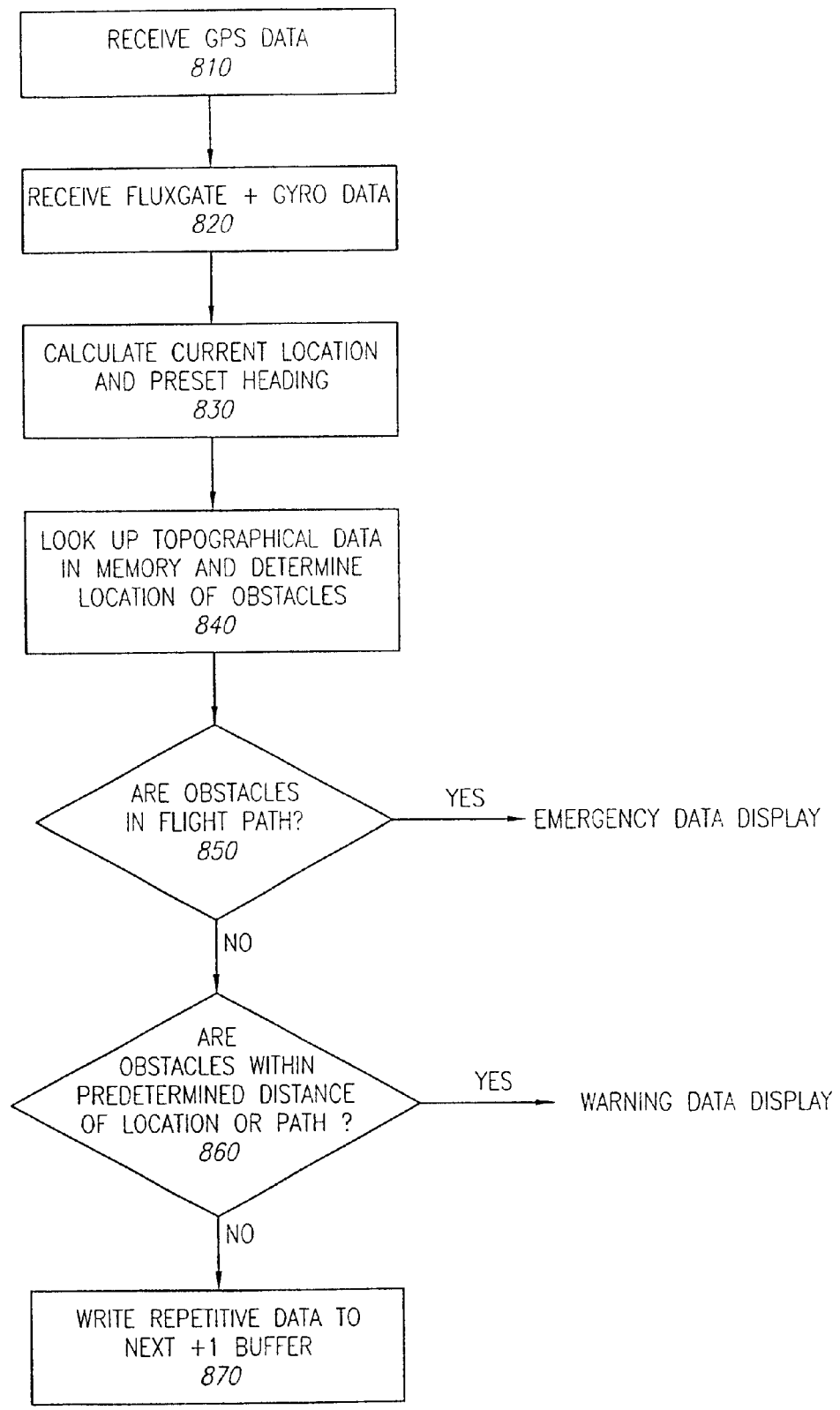
FIG. 6 is a flow chart of a subroutine for use in the program flow of FIG. 5.

An example of such a subroutine is illustrated in FIG. 6. For example, assuming the user had the terrain data and G.P.S. and topographical data functions of the device turned off, in step 810, the processor would review the sensed G.P.S. data. In step 820, it would receive the flux gate and gyro data. In step 830 it would use the data from step 810 and 820 to calculate the current location and attitude of the plane and its present flight path. In step 840 it would look up the topographical data in memory 410 associated with the location and flight path calculated in step 830 and determine the location of any obstacles. In step 850 the processor would determine if any obstacles are in the current flight path. If yes, it would write emergency graphical data to the next buffer to be displayed by the LCD. If no, it would proceed to step 860 and determine if any obstacles are located within a predetermined distance of the plane's current location or flight path. If yes, warning data would be written into the graphical buffer to next be painted on to the LCD. For example, if in step 850 an obstacle is found to be within the flight path, it may be written to the buffer so as to show up in bright red and flashing on the next screen. If in step 860 an obstacle is found within the predetermined location of the aircraft, but not directly within the flight path, a yellow or amber symbol may be displayed on the screen so as to advise the pilot to closely monitor the location of that obstacle.

In determining whether an obstacle is within the flight path, the system considers the altitude of the obstacle and the plane, as well as the current flight path. For example, if an obstacle is located at 1200 feet elevation, and the plane is currently flying at 6000 feet, a warning would not be issued, unless the plane was in a descending course that would put it on course with the obstacle.

Referring again to the main program flow of FIG. 5, in step 760 the processor will write the graphical data to the next buffer in memory 420 and in step 770 repetitive data is written in the next plus 1 buffer. In step 780, the next plus 2 buffer is cleared and in step 790 the process is looped back to the beginning and repeated.

Display Screens

Figure 7A:
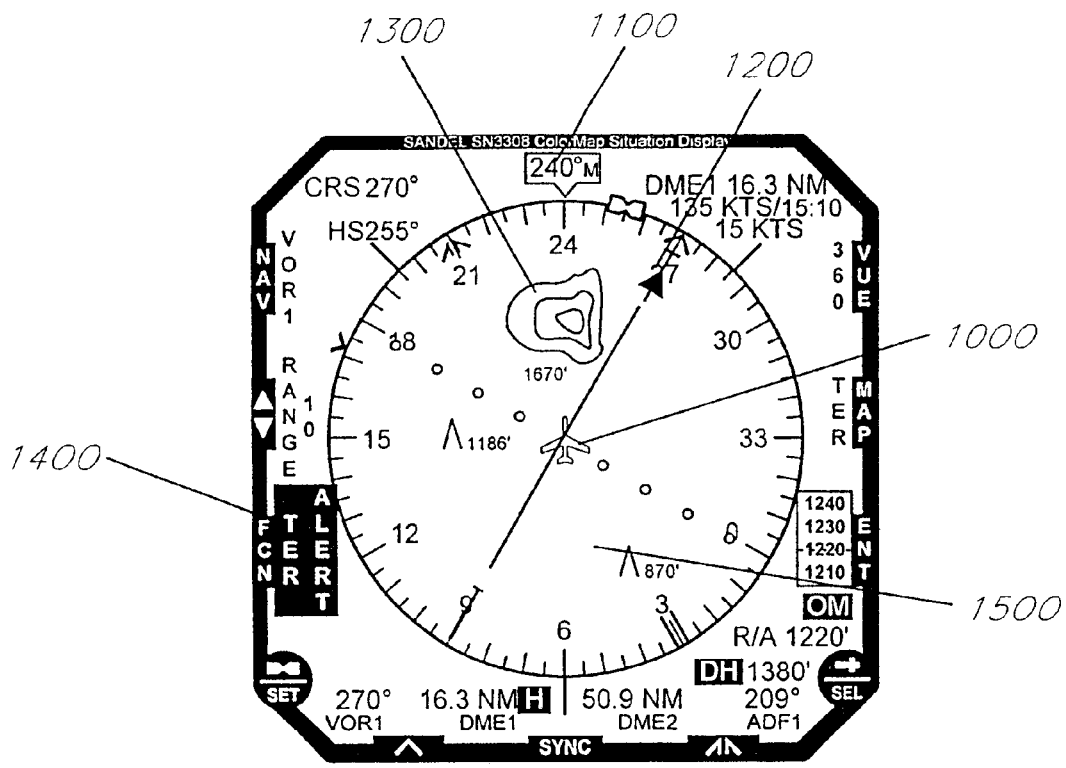
FIGS. 7A and 7B are representative display screens of one embodiment of the invention.
Figure 7B:
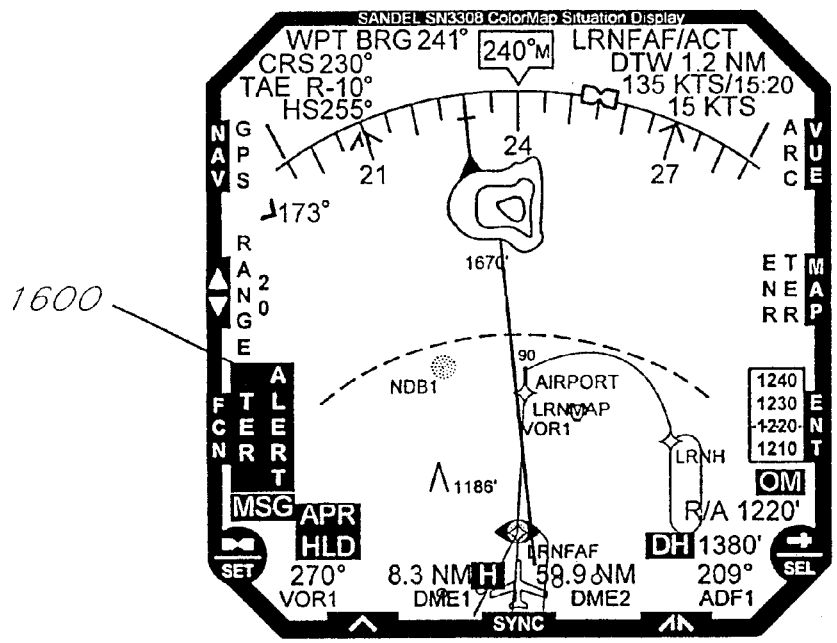

FIGS. 7A and 7B illustrate representative screens which may be displayed using the present system. FIG. 7A illustrates a 360 degree view with graphical representations of man made obstacles, as well as natural terrain obstacles. The current location of the plane is illustrated by a plane icon 1000. The current heading is illustrated as 240 degrees by icon 1100 and the current flight course is illustrated by line 1200. A natural terrain obstacle is illustrated as icon 1300. Natural obstacle 1300 has an elevation of 1670 feet, which may be considered dangerously close to the plane's current elevation of 1220 feet. Furthermore, the current flight course may be considered dangerously close to the natural terrain object 1300, therefore an alert would be generated. As a result, for example, alert icon 1400, as well as icon 1300 itself, may flash in red or amber. In addition, an audible alarm may be sounded. Referring to the same figure, man made obstacles 1500 are represented by inverted "V's" on the screen.

FIG. 7B is similar to FIG. 7A described above, except it is in "arc" or 90 degree view, thereby only providing the pilot with a forward looking perspective. In addition, other graphical images may be presented on the display. For example, in FIG. 7B a nondirectional beacon 1600 is illustrated on the display.

As may be well appreciated by those of ordinary skill in the art any type of navigational display may be presented on the display of the present invention. Accordingly, the above described examples are to be recognized merely as illustrative and not exhaustive of the scope of the invention.

Construction

Figure 8A:
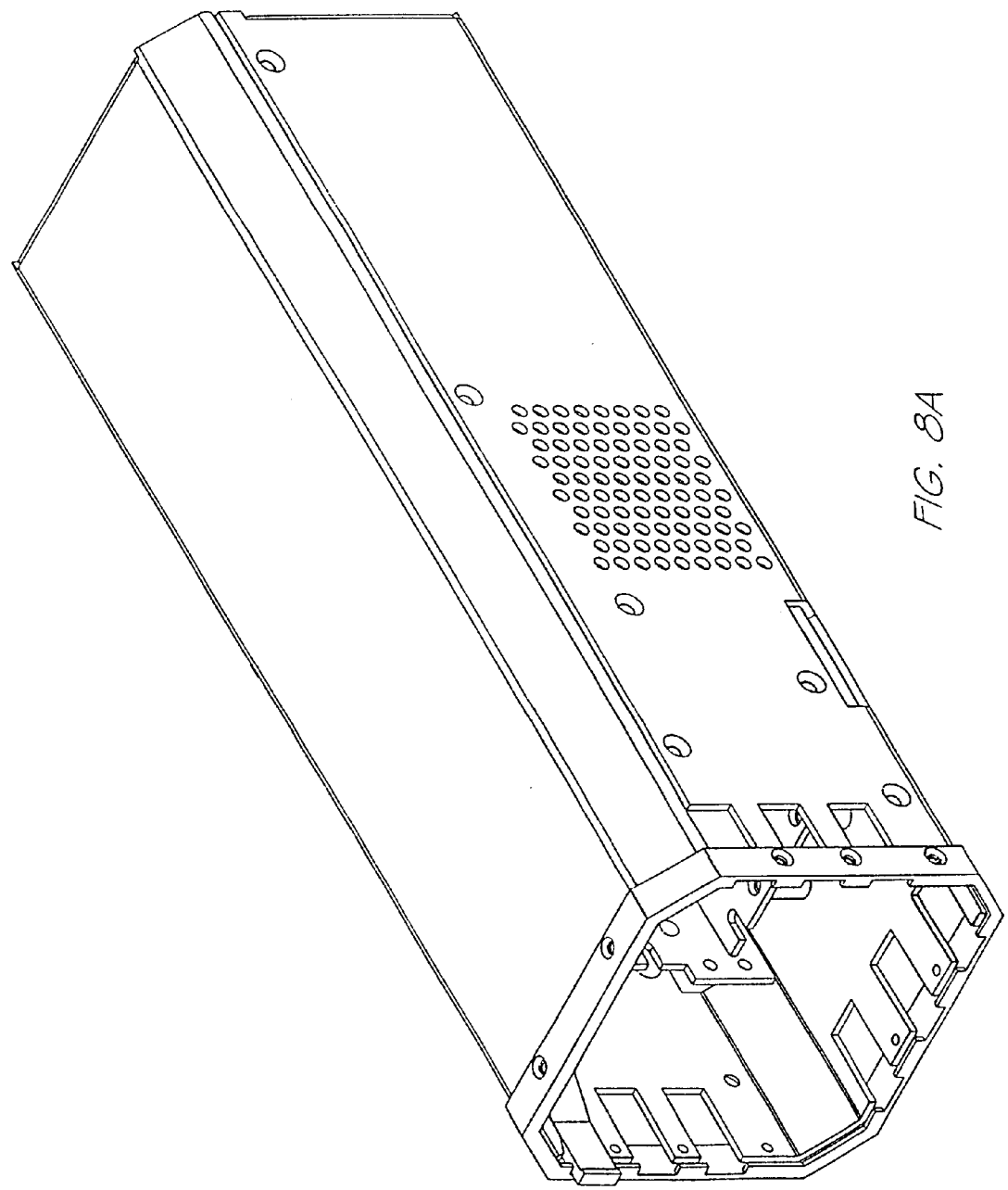
FIGS. 8A and 8B illustrate an embodiment of the invention for use in a 3ATI slot.
Figure 8B:
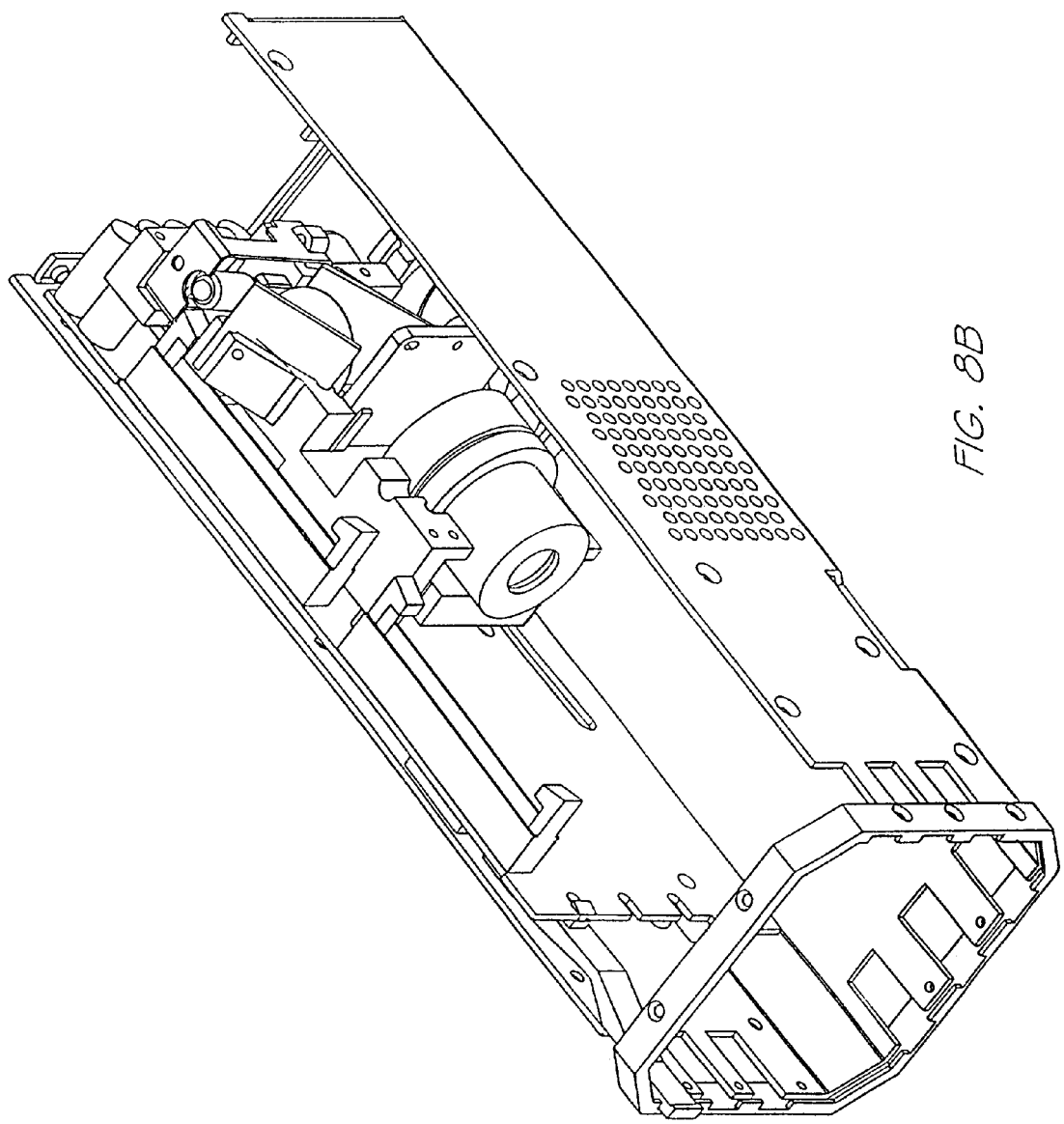

FIG. 8A illustrates an example of an embodiment of the invention for use in a 3ATI slot as used in the invention. FIG. 8B is a partial breakaway of the housing of the embodiment for use with a 3ATI slot with the rear projection system of the invention disposed therein. For simplicity, other components are not shown in the figure.

While the invention has been described above with particular reference to an avionics display system, it will be appreciated that it may be used in any vehicle display system. In particular, it is extremely well-suited for freight and commercial trains as well as high-speed bullet train systems. Moreover, while the Avionics display has been disclosed with reference to the 3ATI system, it is clearly understood that it may be used in other slot sizes and its applicability is clearly pertinent thereto.

What is claimed is:

1. A method of warning an airplane pilot of dangerous proximity to an obstacle using a rear projecting display device, comprising:
   (d) receiving G.P.S. data providing the plane's current geographical location;
   (e) comparing the received G.P.S. data with topographical data stored in a computer memory and determining whether the plane is within a predetermined threshold range of an obstacle; and
   (f) if the plane is within the predetermined threshold, projecting a visual warning on a screen using a rear projection system, the rear projection system for projecting aviation information onto a display screen having a first geometric shape, the system further having an image generator mounted within a housing and spaced from and not coupled to the display screen, the image generator including:
      a rear projection LCD, which generates an image containing the aviation information to be displayed on the screen, the LCD having a total potential image generation area of a second geometric shape that is different from the first geometric shape, and
      a projection lens for projecting the image from the LCD to the display screen.

2. A method of warning an airplane pilot of proximity to an obstacle using a rear projection display device, comprising:
   receiving sensor data from multiple sensors within the plane;
   using the sensor data to calculate the current location and current flight path of the plane;
   using the calculated current location and present flight path to look up data in a topographical data database to determine whether obstacles are within the current flight path or a predetermined location of the plane;
   if an obstacle is within a predetermined location of the plane, but not within the current flight path, project a first visual warning on a display screen having a first geometric shape using a rear projection system, the rear projection system having an image generator mounted within a housing and spaced from and not coupled to the display screen, including:
      a rear projection LCD, which generates an image containing the aviation information to be displayed on the screen, the LCD having a total potential image generation area of a second geometric shape that is different from the first geometric shape, and
      a projection lens for projecting the image from the LCD to the screen; and
   if an obstacle is within the current flight path, project a second visual warning, which indicates a greater severity level than the first visual warning, on the display screen using the rear projection system.

3. The method of claim 2, wherein the rear projection system includes:
   a light source,
   a condenser lens for collimating light from the light source,
   means for converting the collimated light into a red light component, a green light component and a blue light component and projecting the red, green and blue light components at different angles;
   an LCD, which receives the red, green and blue light components and generates, under control of a microprocessor, the desired color images to be displayed, and
   a projection lens for projecting the desired color images from the LCD to the rear projection screen.

4. The method of claim 3, wherein said receiving step includes the step of receiving G.P.S. data providing the plane's current geographical location.

5. The method of claim 3, wherein said sensors data includes data from a flux gate and gyro.

6. The method of claim 2, wherein said receiving step includes the step of receiving G.P.S. data providing the plane's current geographical location.

7. The method of claim 2, wherein said sensors data includes data from a flux gate and gyro.

8. A method of operating an avionics display system using a rear projection display unit, the method comprising:
   providing a rear projection avionics display device comprising:
      a housing,
      a display screen having a total displayable area of a first geometric shape for displaying aviation information, the display screen being mounted to cover an open end of the housing, the total display area of the display screen having an aspect ratio of 1:1,
      a rear projection imager, for projecting the aviation information on the screen, having a total potential image generation area of a second geometric shape that is different from the first geometric shape, the imager being mounted within the housing, the imager being spaced from and not coupled to the display screen, the total potential image generation area of the imager having an aspect ratio of 4:3, and
      a user input mechanism for altering the type of information projected on the screen;
   receiving data concerning various parameters of potential interest to a pilot;
   based on the user input mechanism and the received data, projecting information of interest onto the screen;
   receiving sensor data from sensors within the plane;
   using the sensor data to calculate the current location and current flight path of the plane;
   using the calculated current location and current flight path to look up data in a topographical data database to determine whether obstacles are within the current flight path or a predetermined location of the plane;
   if an obstacle is within a predetermined location of the plane, but not within the current flight path, project a first visual warning on a display screen using the rear projection imager even if the user input mechanism is set such that such information is not selected for viewing by the pilot; and
   if an obstacle is within the current flight path, project a second visual warning, which indicates a greater severity level than the first visual warning, on the display screen using the rear projection imager even if the user input mechanism is set such that such information is not selected for viewing by the pilot.

9. The method of claim 8, wherein the rear projection imager includes:
   a light source,
   a condenser lens for collimating light from the light source,
   means for converting the collimated light into a red light component, a green light component and a blue light component and projecting the red, green and blue light components at different angles;

an LCD, which receives the red, green and blue light components and generates, under control of a microprocessor, the desired color images to be displayed, and a projection lens for projecting the desired color images from the LCD to the rear projection screen.

10. The method of claim 9, wherein said receiving step includes the step of receiving G.P.S. data providing the plane's current geographical location.

11. The method of claim 9, wherein said sensors data includes data from a flux gate and gyro.

12. The method of claim 8, wherein said receiving step includes the step of receiving G.P.S. data providing the plane's current geographical location.

13. The method of claim 8, wherein said sensors data includes data from a flux gate and gyro.

14. A method of warning an airplane pilot of dangerous proximity to an obstacle using a rear projecting display device, comprising:

(a) receiving sensor data providing the plane's current geographical location;

(b) comparing the received sensor data with topographical data stored in a computer memory and determining whether the plane is within a predetermined threshold range of an obstacle; and (c) if the plane is within the predetermined threshold, projecting a visual warning on a screen using a rear projection system, the rear projection system for projecting aviation information onto a display screen having a first geometric shape, and having an image generator mounted within a housing and spaced from and not coupled to the display screen, including:

a rear projection LCD, which generates an image containing the aviation information to be displayed on the screen, the LCD having a total potential image generation area of a second geometric shape that is different from the first geometric shape, and a projection lens for projecting the image from the LCD to the screen.

* * * * *